United States Patent
Liu

(10) Patent No.: US 7,327,733 B2
(45) Date of Patent: Feb. 5, 2008

(54) FLUSHING METHOD WITH SEPARATED SETS FOR TYPE 5 LINK STATE ADVERTISEMENT IN OPEN SHORTEST PATH FIRST PROTOCOL

(75) Inventor: Weigang Liu, Shenzhen (CN)

(73) Assignee: Huawei Technologies Co., Ltd., Shanzhen (CN)

( * ) Notice: Subject to any disclaimer, the term of this patent is extended or adjusted under 35 U.S.C. 154(b) by 885 days.

(21) Appl. No.: 10/454,495

(22) Filed: Jun. 5, 2003

(65) Prior Publication Data

US 2004/0013091 A1    Jan. 22, 2004

(30) Foreign Application Priority Data

Jun. 6, 2002    (CN) ................................ 02 1 22922

(51) Int. Cl.
*H04L 12/28* (2006.01)
*H04L 12/56* (2006.01)

(52) U.S. Cl. ....................... 370/392; 370/400
(58) Field of Classification Search ................ 370/237, 370/252; 709/242
See application file for complete search history.

(56) References Cited

U.S. PATENT DOCUMENTS

| | | | |
|---|---|---|---|
| 6,850,486 B2* | 2/2005 | Saleh et al. | 370/218 |
| 6,985,959 B1* | 1/2006 | Lee | 709/238 |
| 7,002,917 B1* | 2/2006 | Saleh | 370/238 |
| 2003/0046427 A1* | 3/2003 | Goringe et al. | 709/242 |
| 2003/0123457 A1* | 7/2003 | Koppol | 370/400 |

* cited by examiner

*Primary Examiner*—Seema S. Rao
*Assistant Examiner*—Jianye Wu
(74) *Attorney, Agent, or Firm*—Bacon & Thomas, PLLC

(57) ABSTRACT

Disclosed is a flushing method with separated sets for type 5 Link State Advertisement (LSA) in the Open Shortest Path First (OSPF) protocol. All LSAs originated in a network device are separated into S sets with a mapping method in advance. Only one set of LSAs are flushed at first; then another set of LSAs are flushed in order at a flushing interval. The method reduces the instantaneous traffic impact on a network by the LSAs greatly, so the network keeps a low level load. Furthermore, the method guarantees that all LSAs are flushed once every network flush interval, so the OSPF protocol can be implemented normally.

9 Claims, 1 Drawing Sheet

FLUSHING METHOD WITH SEPARATED SETS FOR TYPE 5 LINK STATE ADVERTISEMENT IN OPEN SHORTEST PATH FIRST PROTOCOL

FIELD OF THE INVENTION

The present invention relates to data communications. In particular, the present invention relates to a flushing method with separated sets for type 5 Link State Advertisement (LSA) in the Open Shortest Path First (OSPF) protocol.

BACKGROUND OF THE INVENTION

OSPF protocol, a widely used routing protocol, employs a link-state arithmetic. In brief, each router tests its link state to each of its neighbors and forms LSAs. Then each router calculates the routing information according to all received LSAs that propagate throughout the autonomous system network.

In OSPF protocol, type 5 LSA is used to represent external routing. With the great development of network technology, the number of type 5 LSAs will be exceedingly increased, possibly reaching several hundred thousand. The Internet Engineering Task Force (IETF) Request For Comments (RFC) 2328 standard defines that all the LSAs originated by routers are flushed at every interval, say 1,800 seconds, i.e., each new version of every LSA is sent out at the interval. In this instance, a LSA will be regarded by other routers that it has been deleted if it is not flushed within 3,600 seconds.

This is a simple fixed interval processing mode. In this mode, after originating a LSA, a network device will send a new version of it after 1,800 seconds, i.e., flush for once. This mode has a disadvantage that the flushing processing will occupy a great lot of network bandwidth resources if the number of type 5 LSAs is huge enough. This will decrease the network traffic and impact on the processing of other network devices.

Suppose a network device originates several hundred thousand type 5 LSAs at one time, then all the LSAs will be flushed simultaneously in 1,800 seconds. At the moment, several ten thousand packets appeared in the network. It is very possible that the network cannot be loaded with such intense traffic, then parts of the packets are lost and will be multiply re-transmitted. Moreover, the flushed LSAs will propagate to all network devices in this network, which impacts on other devices. Some network devices, especially those with low processing capabilities, may suffer from block, no response and services interruption etc.

SUMMARY OF THE INVENTION

In order to reduce traffic impact on network and to ensure stable operation, it is an object of the present invention to provide a flushing method with separated sets for type 5 LSA in OSPF protocol.

The method according to the present invention comprises:

1. when there are a great lot of type 5 LSAs in a network device running OSPF protocol, separating all the LSAs into S sets evenly with a mapping method, naming the number of each set as 1, 2 . . . S respectively, i.e., mapping the identification (ID) values of LSAs onto the numbers ranging from 1 to S;

2. recording the number of current processing set as N whose value is 1, 2 . . . S in the network device;

3. for each set waiting for a flushing interval whose length is that of the network flushing interval divided by S;

4. flushing all LSAs in the $N^{th}$ set, then adding 1 to N and determining whether N is greater than S; if so, setting N to 1 and returning to step 3 and step 4, otherwise returning to step 3 and step 4 directly.

In the above-mentioned method, the network device running OSPF protocol can be a router or an Ethernet level 3 exchange. The network flushing interval is defined by the IETF RFC 2328.

In the above-mentioned method, the mapping method may include adding 1 to the remainder of the ID value of a LSA divided by S. In addition, the mapping method may includes:

a. dividing the ID value of a LSA into P bytes, wherein P is an even number;

b. making exclusive-OR operation for the first P/2 bytes and the last P/2 bytes;

c. adding 1 to the remainder of the result of exclusive-OR operation divided by S.

The method according to the present invention can effectively reduce the impact of instantaneous traffic on network. The traffic is effectively distributed to different instants, and the network always keeps a low level load. With this method, running the OSPF protocol will not cause out burst of peak traffic on the network. This will avoid the impact on other network devices on the network and it will make for stable and high-efficient operation of all network devices. It is obvious that all the type 5 LSAs are flushed once within every 1,800 seconds after processing of separating sets has been accomplished. This ensures the normal operation of OSPF protocol mechanism.

DETAILED DESCRIPTION OF THE INVENTION

The invention will be described in detail hereinafter, with reference to two embodiments.

Figure 1:
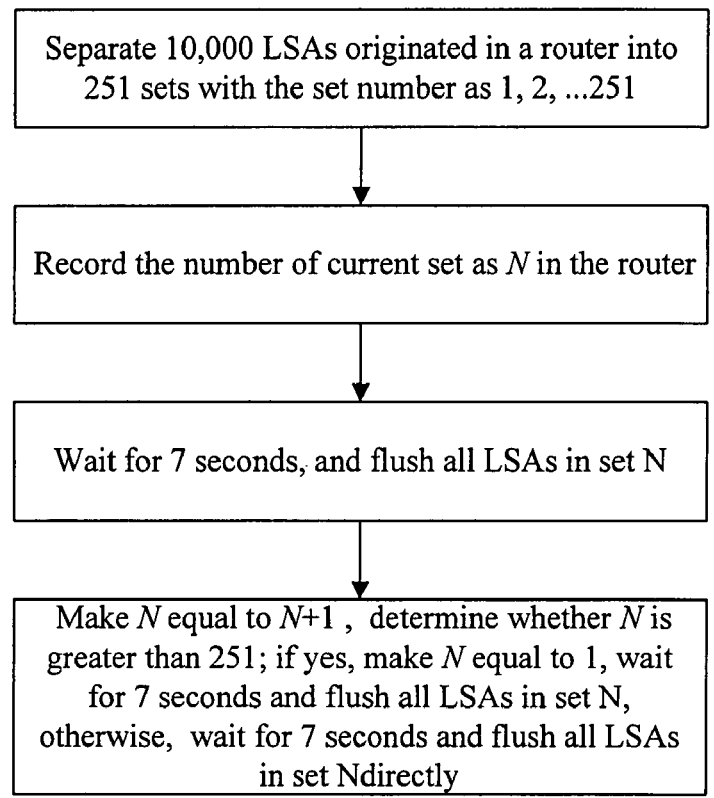
FIG. 1 is a flowchart showing a flushing method according to a preferred embodiment of the invention.

In the first embodiment, as shown in FIG. 1, the invention is implemented on a router.

Suppose that a router originates 10,000 LSAs. Firstly, separate all the LSAs into 251 sets, that is, map the ID values of all LSAs onto the numbers ranging from 1 to 251. The mapping method can make use of a modular arithmetic, i.e., adding 1 to the remainder of the ID value of a LSA divided by 251. It is seen that all the LSAs are evenly separated into 251 sets after this step, with the set number as 1, 2, . . . 251.

Secondly, record the number of current set as N in the router, and sets 1 as the initial value of N.

Thirdly, wait for 7 seconds (7 is the approximate value of 1,800 divided by 251), and then all the LSAs in set 1 are processed and flushed.

Next, add 1 to number N, which is 1 at this time, and flush all the LSAs in the set 2 and so on. When N exceeds 251, it will be set to 1 again. Then, after waiting for another 7 seconds, repeat the above-mentioned procedures from set 1.

It can be seen that 10,000 LSAs need to be flushed at one time before the invention is applied, which will have impact on the network, i.e. the network may possibly be blocked to a certain degree. In contrast to prior art, the LSAs are flushed every 7 seconds and only about 40, the approximate value of 10,000 divided by 251, LSAs are flushed each time with this invention.

Figure 2:
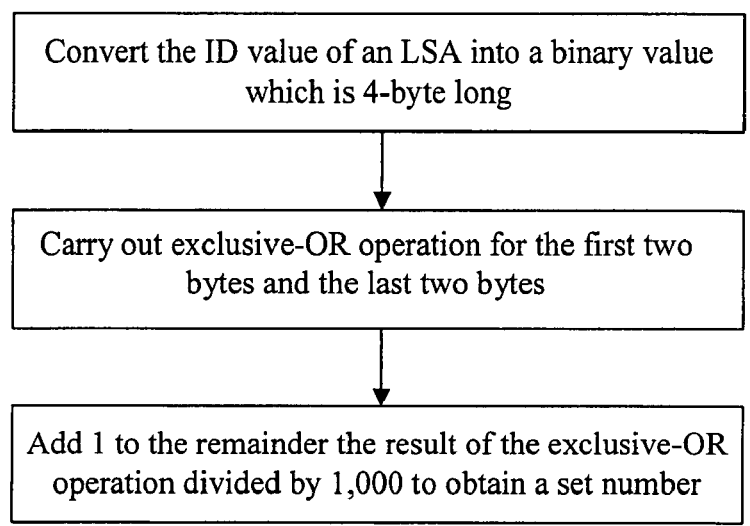
FIG. 2 is a flowchart showing portions of a flushing method according to a second preferred embodiment of the invention.

In the second embodiment, illustrated in FIG. 2, the invention is implemented on an Ethernet level 3 exchange.

Suppose that an Ethernet level 3 exchange originates 100 thousand LSAs. Firstly, separate all the LSAs into 1,000 sets, namely, map the ID values of all LSAs onto the numbers ranging from 1 to 1,000. The mapping method can use an overlap exclusive-OR, which will be described specifically as follow.

a. Divide the ID value of a LSA that is a 32 bits integral into 4 bytes.

b. Carry out exclusive-OR operation for the first two bytes and the last two bytes, and get a new 16 bits integral.

c. Add 1 to the remainder of the result obtained at step b divided by 1,000.

It can be seen that all LSAs are basically even separated into 1,000 sets, with the set number as 1, 2 . . . 1,000.

Then, record the number of current set as N in the Ethernet level 3 exchange, and sets 1 as the initial value of N.

Next, wait for 1.8 seconds (1.8 is the value of 1,800 divided by 1,000), and then all the LSAs in set 1 are flushed. Then, add 1 to number N, which is 1 at this time, and flush all the LSAs in the set 2 and so on. When N exceeds 1,000, it will be set to 1 again. Then, after waiting for another 1.8 seconds, repeat the above-mentioned procedures from set 1.

It also can be seen that 100 thousand LSAs are flushed each time before the invention is applied, which will have a large impact on the network. In this instance, because of this impact, the network may be interrupted temporarily, and some network devices may stop response. With the method, LSAs are flushed every 1.8 seconds, and about 100, the value of 100 thousand divided by 1,000, LSAs are flushed each time. In this way, only several tens messages of route information are sent out. This will not affect the work of the network link again and will effectively protect the network devices also.

The method according to the present invention is very efficient and can be applied for various kinds of routers and exchanges. The above-mentioned mapping method can employ a modular arithmetic or an overlap exclusive-OR arithmetic. So it is to be understood that the invention is not limited to the disclosed embodiments, but, on the contrary, is intended to cover various modifications and equivalent arrangements included within the spirit and scope of the appended claims.

That which is claimed is:

1. A flushing method with separated sets for type 5 Link State Advertisement (LSA) in an Open Shortest Path First (OSPF) protocol, comprising the steps of:

separating all type 5 LSAs originating in a network device into S sets, wherein S is an integer; and flushing the S sets of LSAs in turn, wherein a flushing interval of flushing two adjacent sets of LSAs is determined by dividing a network flushing interval by S.

2. The method of claim 1, wherein the step of separating all type 5 LSAs originating in a network device into S sets comprises the step of:

mapping an identification (ID) value of an LSA onto a set number, wherein the set number indicates which set the LSA belongs to.

3. The method of claim 2, wherein the step of mapping an ID value of an LSA onto a set number comprises the step of:

obtaining the set number by adding 1 to the remainder of the ID value of the LSA divided by S.

4. The method of claim 2, wherein the step of mapping an ID value of an LSA onto a set number comprises the steps of:

converting the ID value of the LSA into a binary value which is P bytes long, wherein P is an even number;

carrying out an exclusive-OR operation for a first P/2 bytes and a last P/2 bytes of the binary value; and obtaining the set number by adding 1 to the remainder of the result of the exclusive-OR operation divided by S.

5. The method of claim 1, wherein the network device is a router or an Ethernet level 3 exchange.

6. The method of claim 1, wherein the network flushing interval is defined by an Internet Engineering Task Force (IETF) Request For Comment (RFC) 2328.

7. An apparatus for flushing type 5 Link State Advertisement (LSA) in an Open Shortest Path First (OSPF) protocol, comprising:

a first unit, configured to separate all type 5 LSAs originating in a network device into S sets, wherein S is an integer;

a second unit, configured to flush the S sets of LSAs in turn, wherein a flushing interval for flushing two adjacent sets of LSAs is determined by dividing a network flushing interval by S.

8. The apparatus of claim 7, wherein the first unit obtains a set number by adding 1 to the remainder of the ID value of an LSA divided by S, and wherein the set number indicates which set the LSA belongs to.

9. The apparatus of claim 7, wherein the first unit comprises:

a first module, configured to convert an identification (ID) value of an LSA into a binary value which is P bytes long, wherein P is an even number;

a second module, configured to carry out an exclusive-OR operation for a first P/2 bytes and a last P/2 bytes of the binary value;

a third module, configured to obtain a set number by adding 1 to the remainder of the result of the exclusive-OR operation divided by S, wherein the set number indicates which set the LSA belongs to.

* * * * *